United States Patent [19]
Jennrich et al.

[11] Patent Number: 5,662,581
[45] Date of Patent: Sep. 2, 1997

[54] EASILY STERILIZABLE GLOVE SYSTEM

[75] Inventors: Carleton E. Jennrich, Welch; Rudolph O. Marohl, Red Wing, both of Minn.

[73] Assignee: Delaware Capital Formation, Inc., Wilmington, Del.

[21] Appl. No.: 369,125

[22] Filed: Jan. 5, 1995

[51] Int. Cl.$^6$ .......................... A61G 10/00; A61G 10/02
[52] U.S. Cl. .................................................. 600/21; 312/1
[58] Field of Search ............................... 128/897; 600/21, 600/22; 312/1; 976/DIG. 362; 285/260; 49/47.5, 1; 52/204, 593; 2/16, 161.6, 161.7

[56] References Cited

U.S. PATENT DOCUMENTS

| | | | |
|---|---|---|---|
| 3,475,808 | 11/1969 | Woolsey | 312/1 |
| 4,010,588 | 3/1977 | Eisert | 312/1 |
| 4,141,609 | 2/1979 | Eisert | 312/1 |

Primary Examiner—Angela D. Sykes
Assistant Examiner—Samuel Gilbert
Attorney, Agent, or Firm—Burd, Bartz & Gutenkauf

[57] ABSTRACT

An easily sterilizable glove system for use for performing work within a glove box or similar sealed enclosure within which operations are carried out under sterile conditions. The shoulder end of an elongated arm-length impermeable leak-proof flexible sleeve having a flexible impermeable leak-proof glove at the wrist end is held clamped between a smooth surfaced annular lip in a port in the wall of the enclosure and a compressed O-ring. The minimal area of sealing contact between two smooth surfaces is easily sterilized by the vaporous sterilants commonly used. Preferably the glove is separable and replaceable and similarly held between a smooth surfaced annular lip in a port at the wrist end of the sleeve and the compressed bead at the cuff of the glove, defining another easily sterilizable minimal area of sealing contact.

12 Claims, 3 Drawing Sheets

5,662,581

EASILY STERILIZABLE GLOVE SYSTEM

BACKGROUND OF THE INVENTION

1. Field of the Invention

This invention relates to a sealed glove system for facilitating the performance of work within a sterile enclosure by an operator outside of the enclosure in extending his hand and arm through a glove sealed in a port in a barrier wall of the enclosure. The system of this invention differs from the conventional sealed glove box system by providing structure which eliminates the usual cracks and crevices which may harbor microorganisms and shelter them from the effects of sterilization.

In recent years, in the pharmaceutical industry, because of the high expense of maintaining so-called "clean rooms" into which persons may enter to carry out required procedures, more operations are being carried out inside smaller isolation chambers, in the nature of glove boxes, which do not require entry of work persons. However, the requirement remains for maintaining sterile conditions within the isolation chamber. Although the invention is described with particular reference to its use in the pharmaceutical industry, it will be understood that the system is applicable to any operation requiring the maintenance of sterile conditions within an enclosure.

2. The Prior Art

Saunders U.S. Pat. No. 3,084,684, Renehan U.S. Pat. No. 3,099,015, and Eisert U.S. Pat. Nos. 4,010,588 and 4,141,609 are representative of systems utilizing removable and replaceable gloves.

SUMMARY OF THE INVENTION

Broadly stated, this invention relates to an easily sterilizable system for effecting access to a sealed sterile enclosure for performing work therein. The system includes a fixed annular flanged port ring secured in leak-proof sealed relation in a port in a barrier wall of the enclosure. The inner periphery of the fixed port ring is defined by an integral smooth surfaced tapered annular lip. A removable sleeve clamp ring extends into and is received within the fixed port ring with a loose slide fit. The clamp ring includes a radially outwardly extending flange on the outermost edge of the sleeve clamp ring which is engageable with the outside face of the port ring. The sleeve clamp ring has a first O-ring-receiving channel in its outer peripheral face adjacent to the innermost edge of the ring and closely spaced radially inwardly from the annular lip of the port ring, and a resilient O-ring is seated within that first channel, the outer periphery of the O-ring extending beyond the outer edge of the first channel. A second sleeve bead-receiving channel is provided in the outer peripheral face of the sleeve clamp ring intermediate of the first channel and the flange. An elongated arm-length impermeable leak-proof flexible sleeve is fitted over the outer periphery of the sleeve clamp ring with its annular bead at its outermost shoulder end seated in the second channel on the sleeve clamp ring. The wall of the sleeve extends between the lip of the port ring and the resilient O-ring in easily sterilizable sealing engagement.

The wrist end of the sleeve supports a glove in sealed leak-proof engagement. The sleeve and glove may be integral, molded in one piece. Preferably, however, the glove is removable from the sleeve and replaceable apart from the sleeve. In this instance, an end effector port ring is secured in leak-proof sealed relation to the innermost wrist end of the sleeve. The inner periphery of the end effector port ring is defined by an integral smooth surfaced tapered annular lip. An end effector clamp ring extends into and is received within the end effector port ring. The end effector clamp ring includes a radially outwardly extending flange on its outermost edge which is engageable with the outside face of the end effector port ring. A bead-receiving channel is provided in the outer peripheral face of the end effector clamp ring adjacent its innermost edge, closely spaced radially inwardly from the annular lip of the end effector port ring. A flexible impermeable leak-proof glove is fitted over the outer periphery of the end effector clamp ring, that glove having an annular bead at its open end which is seated in the bead-receiving channel of the end effector clamp ring to maintain the glove in leak-proof easily sterilizable sealing engagement with the lip of the end effector port ring.

BRIEF DESCRIPTION OF THE DRAWINGS

The invention is illustrated in the accompanying drawings, in which corresponding parts are identified by the same numerals, and in which.

DETAILED DESCRIPTION OF THE PREFERRED EMBODIMENT

Figure 1:
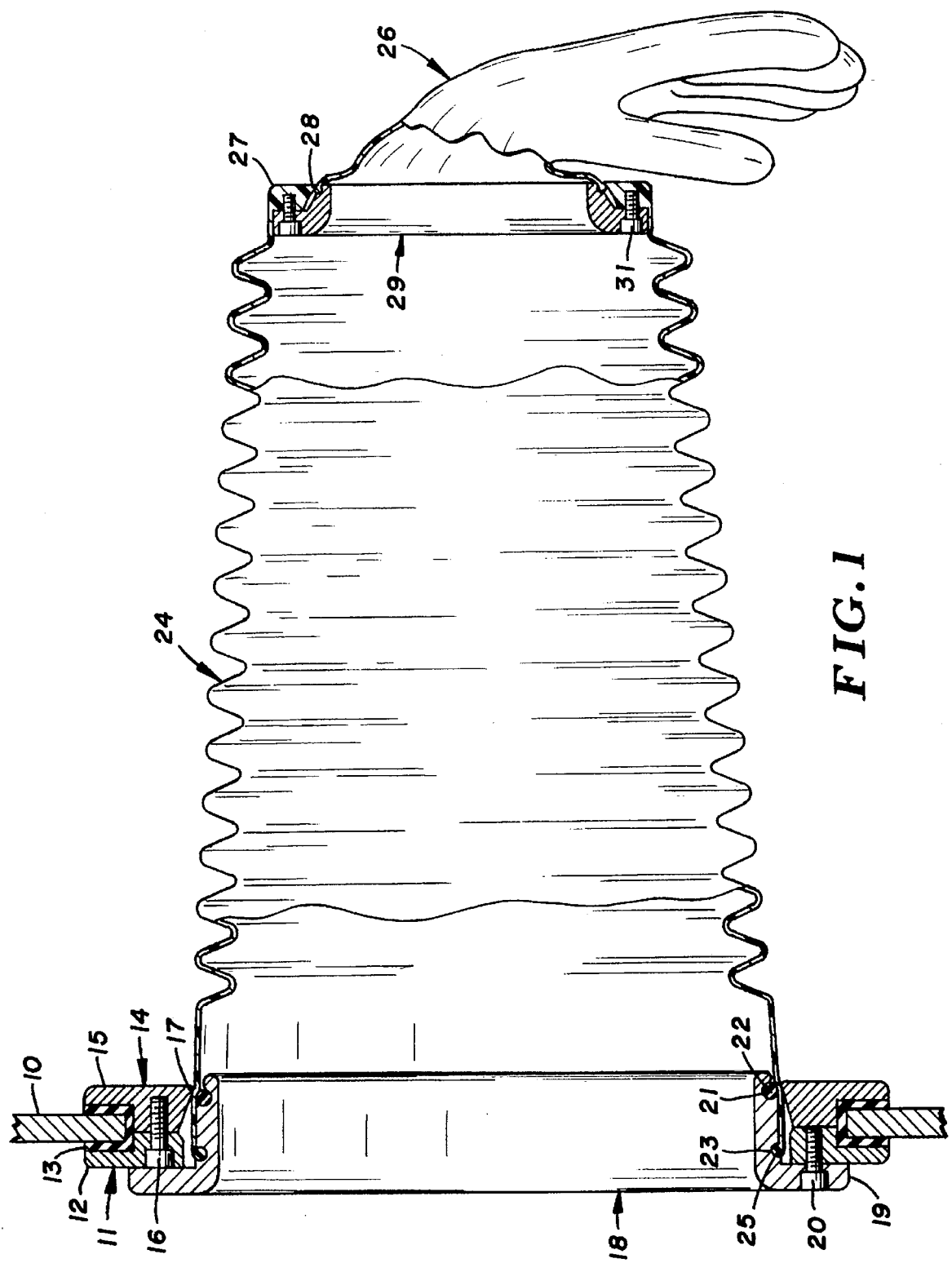
FIG. 1 is a side elevation in section of the preferred form of the glove system of the present invention.
Figure 2:
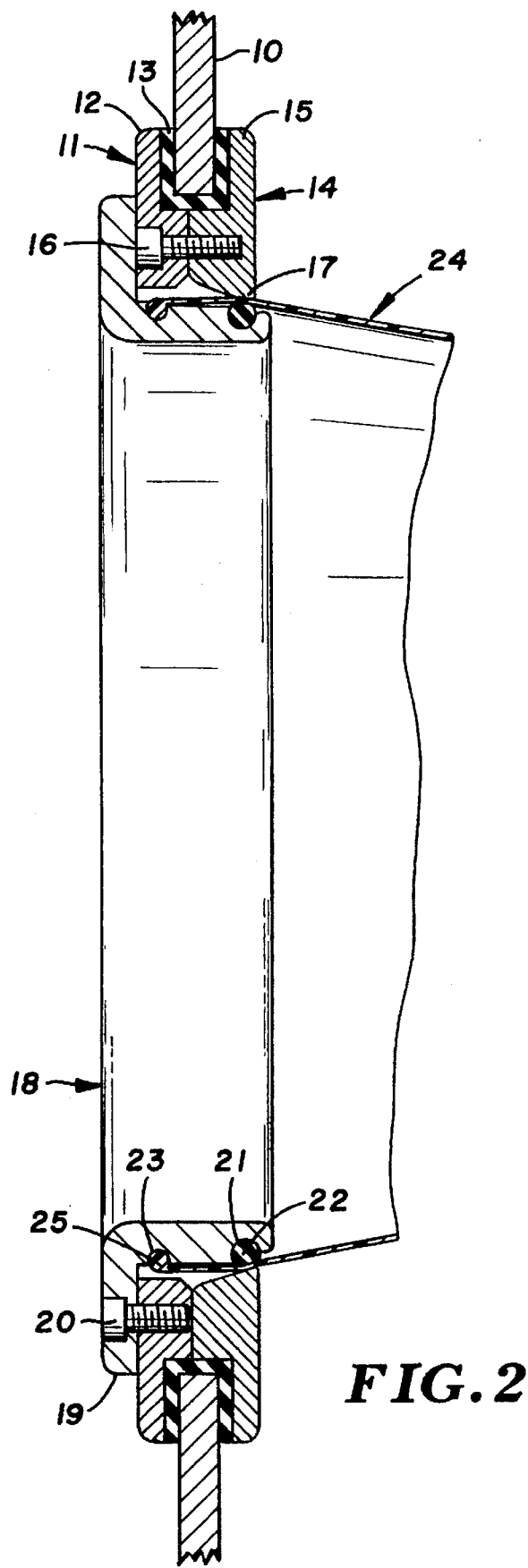
FIG. 2 is an elevation in section on an enlarged scale better showing the details of construction of the port ring and sleeve clamp ring.

Referring now to the drawings, the system of the present invention is intended for use to allow access to a sterile enclosure or isolation chamber to permit a technician to insert his arms and hands through ports in the chamber wall and perform manipulative operations within the enclosed chamber without admission of air from the surrounding ambient environment. The chamber includes an impermeable barrier wall 10 which is usually rigid and generally transparent so as to permit the interior to be viewed from the outside. The wall 10 is provided with a plurality of ports, which may be circular or elliptical. A fixed annular two-part flanged port ring is secured in leak-proof sealed relation in each port. Outer port ring element 11 is provided with a continuous annular radially extending flange 12 which engages the outside face of a continuous resilient U-cross-section sealed gasket 13 which serves as a lining for the port. The inner complementary port ring element 14 is likewise provided with a continuous annular radially extending flange 15 which engages the inner face of sealing gasket 13. The port ring elements are rigidly secured together, as by screws 16. The inner periphery of inner port ring element 14 is provided with a continuous tapered smooth surfaced rounded lip 17, the innermost narrow tip of which defines a narrow sealing surface, as explained hereinafter. Ring 14 is desirably composed of stainless steel. Ring 11 may be aluminum or the like.

A removable sleeve clamp ring 18 extends into and is received within the port ring with a slide fit. Ring 18 is provided with a radially outwardly extending flange 19 on its outermost edge which is engageable with the outside face of outside port ring element 11. Sleeve clamp ring 18 is rigidly secured to the port 15 ring, as by screws 20. A first continuous O-ring-receiving channel 21 is provided in the outer peripheral face of sleeve clamp ring 18 adjacent the innermost edge of that ring. Channel 21 is in alignment with and closely spaced radially inwardly from the annular lip 17 of the port ring, such that when a resilient O-ring 22 is seated in channel 21 it extends beyond the edge of the channel. It is compressible and is engageable with the lip in a sealed leak-proof relation. However, in normal use lip 17 and O-ring 22 are not in direct engagement with one another, but are separated by the thickness of the shoulder portion of a sleeve, as explained hereinafter.

A second continuous sleeve bead-receiving channel 23 is provided in the outer peripheral face of sleeve clamp ring 18 between O-ring channel 21 and flange 19. Elongated arm-length impermeable leak-proof tapered flexible sleeve 24, which has a continuous annular bead 25 at its outermost shoulder end, is fitted over the outer periphery of sleeve clamp ring 18 with bead 25 received within second channel 23. As shown, the wall of sleeve 24 extends between port ring lip 17 and O-ring 22 in sealing engagement.

The only crack or crevice which might harbor bacteria or other microorganisms is the edge of the minimal narrow area of engagement between the smooth surface of lip 17 and the outer smooth surface of sleeve 24. When the isolation area within the enclosure is purged of contamination by sterilization by steam or by vaporous hydrogen peroxide or similar chemical sterilant, that portion of the area of engagement between lip 17 and the outer sleeve 24 on the inside of the enclosure is effectively sterilized.

The wrist end of sleeve 24 is closed by a flexible impermeable leak-proof glove 26. Sleeve 24 is formed from rubber or rubber-like synthetic resinous materials, preferably corrugated as shown, and formed with relatively thick walls, as compared with the glove, for maximum wear and durability. By way of example, sleeve 24 is desirably formed by spraying polyurethane resin uniformally on a mandrel having the form of the sleeve, preferably elliptical at the shoulder end, tapered and circular at the wrist end. Polyurethane has good mechanical strength and resiliency along with abrasion resistance. For chemical resistance the polyurethane structure may be oversprayed with "Hypalon" which is an elastomer made by substituting chlorine and sulfonyl chloride groups into polyethylene.

Glove 26 and sleeve 24 may be formed as an integral one-piece structure. However, wear and damage most frequently occur to the hand enclosing portion of the glove. To replace the glove and integral sleeve is relatively expensive. It is preferable that the glove 26 be separable and replaceable.

Figure 3:
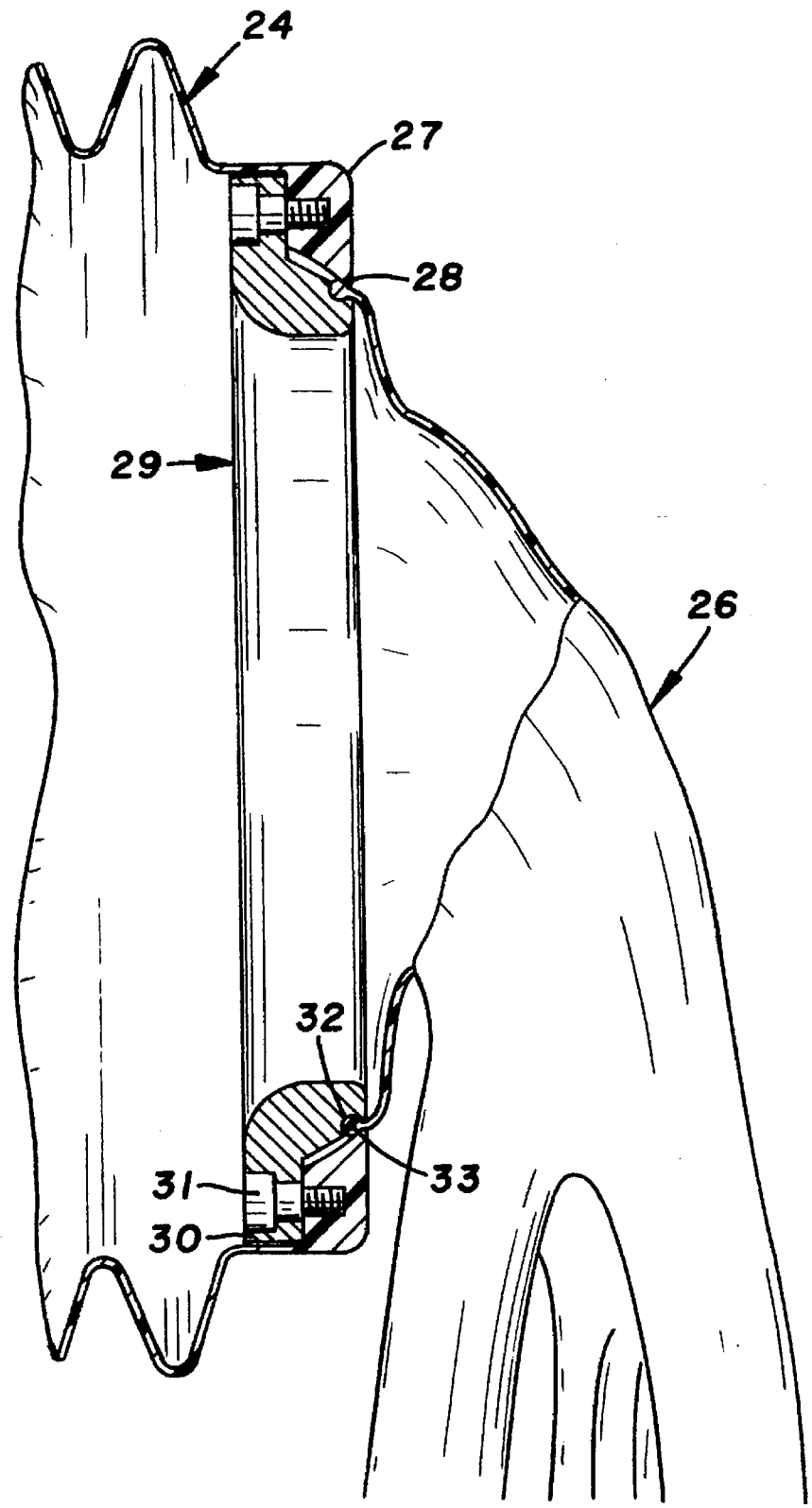
FIG. 3 is an elevation in section on an enlarged scale showing the details of construction of the end effector port ring and end effector clamp ring.

As shown in FIGS. 1 and 3, an end effector port ring 27, of aluminum or the like, is secured in a leak-proof sealed relation to the innermost wrist end of sleeve 24. End effector port ring 27 is joined to sleeve 24 in a seamless construction, preferably by being molded or otherwise formed integrally with the sleeve. The end effector port may be formed from a compatible synthetic resinous material such as polyurethane. The inner periphery of end effector port ring 27 is defined by a continuous tapered integral smooth surfaced rounded lip 28.

An end effector clamp ring 29 extends into and is received in closely spaced relation with end effector port ring 27. End effector clamp ring 29 has a continuous radially outwardly extending flange 30 which is engageable with the outermost edge surface of the end effector port ring 27 the rings are secured together, as by screws 31. A bead-receiving continuous annular channel 32 is provided in the outer peripheral face of end effector clamp ring 29 adjacent its innermost edge. Channel 32 is closely spaced radially inwardly from annular lip 28 of the end effector port ring 27.

Glove 26 is provided with a bead 33 at its open cuff end in the usual manner. Glove 26 is fitted over the outer periphery of end effector clamp ring 29 with its bead seated in and extending above channel 32. Because of the closely spaced relationship between port ring 2 and clamp ring 29, bead 33 is compressed in leak-proof sealing engagement with lip 28 of the end effector port ring. The narrow area of contact between the smooth outer surface of glove bead 33 and smooth surfaced lip 28 is minimal such that any microorganisms harbored within the inner edge of the seal area are killed by the gaseous sterilant used to sterilize the interior of the isolation chamber.

In both the sealing of sleeve 24 to port ring 14 and the sealing of glove 26 to port ring 27, the point of sealing is at the surface, as opposed to creating a crevice. This makes the present system very easy to sterilize with the usual gaseous sterilants.

In the pharmaceutical industry, the isolation chamber is sterilized before the beginning of a required procedure. During the period prior to sterilization sleeve 24 may be installed in the manner described. A glove 26 may easily be replaced by releasing clamp ring 29 from port ring 27, removing the old glove, replacing it with a new glove whose cuff bead is seated in channel 32, and reassembling the end effector structure. Then, after sterilization, the system is used in the conventional manner by the operator inserting his hand and arm into the assembly and performing whatever work that is required within the isolation chamber.

During operation of the procedure the isolation chamber is slightly pressurized. The design of the present system does not allow the glove to blow out through the port, that is, balloon out on the operator's side. Instead, it collapses against the inside of the barrier wall, keeping out of the way of operating machinery but still allowing the operator quick access, if needed.

It is apparent that many modifications and variations of this invention as hereinbefore set forth may be made without departing from the spirit and scope thereof. The specific embodiments described are given by way of example only and the invention is limited only by the terms of the appended claims.

We claim as our invention:

1. An easily sterilizable system for effecting access to a sealed sterile enclosure for performing work therein, said system comprising:
   A) an annular flanged port ring having inner and outer peripheries and being adapted to be fixedly secured in leak-proof sealed relation in a port in the wall of said enclosure, the flange of said ring having an outside face adapted to lie parallel to the enclosure wall,
   B) an annular lip integral with said inner periphery of said port ring extending inwardly from a surface of said port ring,
   C) a removable sleeve clamp ring having innermost and outermost edges and inner and outer peripheral faces, said clamp ring extending into and being receivable within said port ring with a loose slide fit,
   1) a radially outwardly extending flange on the outermost edge of said sleeve clamp ring releasably engaging outside face of said port ring,
   2) a first O-ring-receiving channel having an outer edge and being located in the outer peripheral face of said sleeve clamp ring adjacent the innermost edge thereof, and closely spaced radially inwardly from said annular lip of the port ring,
   3) a resilient O-ring having an outer periphery and being seated within said first channel, the outer periphery of said O-ring extending beyond the outer edge of said first channel, and 4) a second sleeve bead-receiving channel in the outer peripheral face of said sleeve clamp ring intermediate of the first channel and flange, D) an elongated arm-length impermeable leak-proof flexible sleeve having an outermost shoulder end and innermost wrist end and having a flexible impermeable leak-proof glove at its innermost wrist end, said sleeve being fitted over the outer periphery of said sleeve clamp ring, said sleeve having an annular bead at its outermost shoulder end seated in said second channel, the wall of said sleeve being in leak-proof easily sterilizable sealing engagement between said lip and O-ring, said glove having one closed finger and thumb receiving end and an open opposite end.

2. A system according to claim 1 wherein:
A) said sleeve is tapered from its outermost shoulder end to its innermost wrist end, and
B) said sleeve is corrugated throughout its tapered portion.

3. A system according to claim 1 wherein said port ring is elliptical.

4. A system according to claim 1 wherein the glove at the wrist end of the sleeve is separable from the wrist end of the sleeve and replaceable.

5. A system according to claim 4 wherein the system includes:
A) an end effector port ring secured in leak-proof sealed relation to the innermost wrist end of said sleeve,
B) an integral inwardly extending smooth surfaced annular lip defining the inner periphery of said end effector port ring,
C) an end effector clamp ring having innermost and outermost edges and inner and outer peripheral faces, said end effector clamp ring extending into and receivable within said end effector port ring,
1) a radially outwardly extending flange on the outermost edge of said end effector clamp ring engageable with the outside face of said end effector port ring, and
2) a bead-receiving channel in the outer peripheral face of said end effector clamp ring adjacent the innermost edge thereof, and closely spaced radially inwardly from said annular lip of the end effector port ring, and
D) said flexible impermeable leak-proof glove being fitted over the outer periphery of said end effector clamp ring, said glove having an annular bead at its open end seated in said bead-receiving channel of the end effector clamp ring in leak-proof easily sterilizable sealing engagement with the lip of the end effector port ring.

6. A system according to claim 5 wherein said end effector port ring is secured to said sleeve in a seamless construction.

7. A system according to claim 6 wherein said sleeve and end effector port ring are formed together in a one-piece integral structure.

8. An easily sterilizable system for effecting access to a sealed sterile enclosure for performing work therein, said system comprising:
A) an annular flanged port ring having inner and outer peripheries and being adapted to be fixedly secured in leak-proof sealed relation in a port in the wall of said enclosure, the flange of said port ring having an outside face adapted to lie parallel to the enclosure wall,
B) an annular lip integral with said inner periphery of said port ring extending inwardly from a surface of said port ring, C) a removable sleeve clamp ring having innermost and outermost edges and inner and outer peripheral faces, said clamp ring extending into and being receivable within said port ring with a loose slide fit,
1) a radially outwardly extending flange on the outermost edge of said sleeve clamp ring the outside face of said port ring,
2) a first O-ring-receiving channel having an outer edge and being located in the outer peripheral face of said sleeve clamp ring adjacent the innermost edge thereof, and closely spaced radially inwardly from said annular lip of the port ring,
3) a resilient O-ring having an outer periphery and being seated within said first channel, the outer periphery of said O-ring extending beyond the outer edge of said first channel, and
4) a second sleeve bead-receiving channel in the outer peripheral face of said sleeve clamp ring intermediate of the first channel and flange, D) an elongated arm-length tapered impermeable leak-prof flexible sleeve having an outermost shoulder end and innermost wrist end fitted over the outer periphery of said sleeve clamp ring, said sleeve having an annular bead at its outermost shoulder end seated in said second channel, the wall of said sleeve being in leak-proof easily sterilizable sealing engagement between said lip and O-ring, E) an end effector port ring secured in leak-proof sealed relation to the innermost wrist end of said sleeve, F) an integral inwardly extending smooth surfaced annular lip defining the inner periphery of said end effector port ring, G) an end effector clamp ring having innermost and outermost edges and inner and outer peripheral faces, said end effector clamp ring extending into and receivable within said end effector port ring,
1) a radially outwardly extending flange on the outermost edge of said end effector clamp ring engageable with the outside face of said end effector port ring, and
2) a bead-receiving channel in the outer peripheral face of said end effector clamp ring adjacent the innermost edge thereof, and closely spaced radially inwardly from said annular lip of the end effector port ring, and H) a flexible impermeable leak-proof glove having one closed finger and thumb receiving end and an open opposite end, said glove fitted over the outer periphery of said end effector clamp ring, said glove having an annular bead at its open end seated in said bead-receiving channel of the end effector clamp ring in leak-proof easily sterilizable sealing engagement with the lip of the end effector port ring.

9. A system according to claim 8 wherein:
A) said sleeve is tapered from its outermost shoulder end to its innermost wrist end, and
B) said sleeve is corrugated throughout its tapered portion.

10. A system according to claim 8 wherein said port ring is elliptical.

11. A system according to claim 8 wherein said end effector port ring is secured to said sleeve in a seamless construction.

12. A system according to claim 11 wherein said sleeve and end effector port ring are formed together in a one-piece integral structure.

* * * * *

UNITED STATES PATENT AND TRADEMARK OFFICE
CERTIFICATE OF CORRECTION

PATENT NO. : 5,662,581

DATED : September 2, 1997

INVENTOR(S) : Carleton E. Jennrich, et al

It is certified that error appears in the above-identified patent and that said Letters Patent is hereby corrected as shown below:

Column 4, line 5, "2" should be --- 27 ---.

Column 4, line 60, between "engaging" and "outside" --- the --- should be inserted.

Column 6, line 6, between "ring" and "the" --- releasably engaging--- should be inserted.

Signed and Sealed this

Fourteenth Day of July, 1998

*Attest:*

BRUCE LEHMAN

*Attesting Officer*   *Commissioner of Patents and Trademarks*